United States Patent Office 3,308,413
Patented Mar. 7, 1967

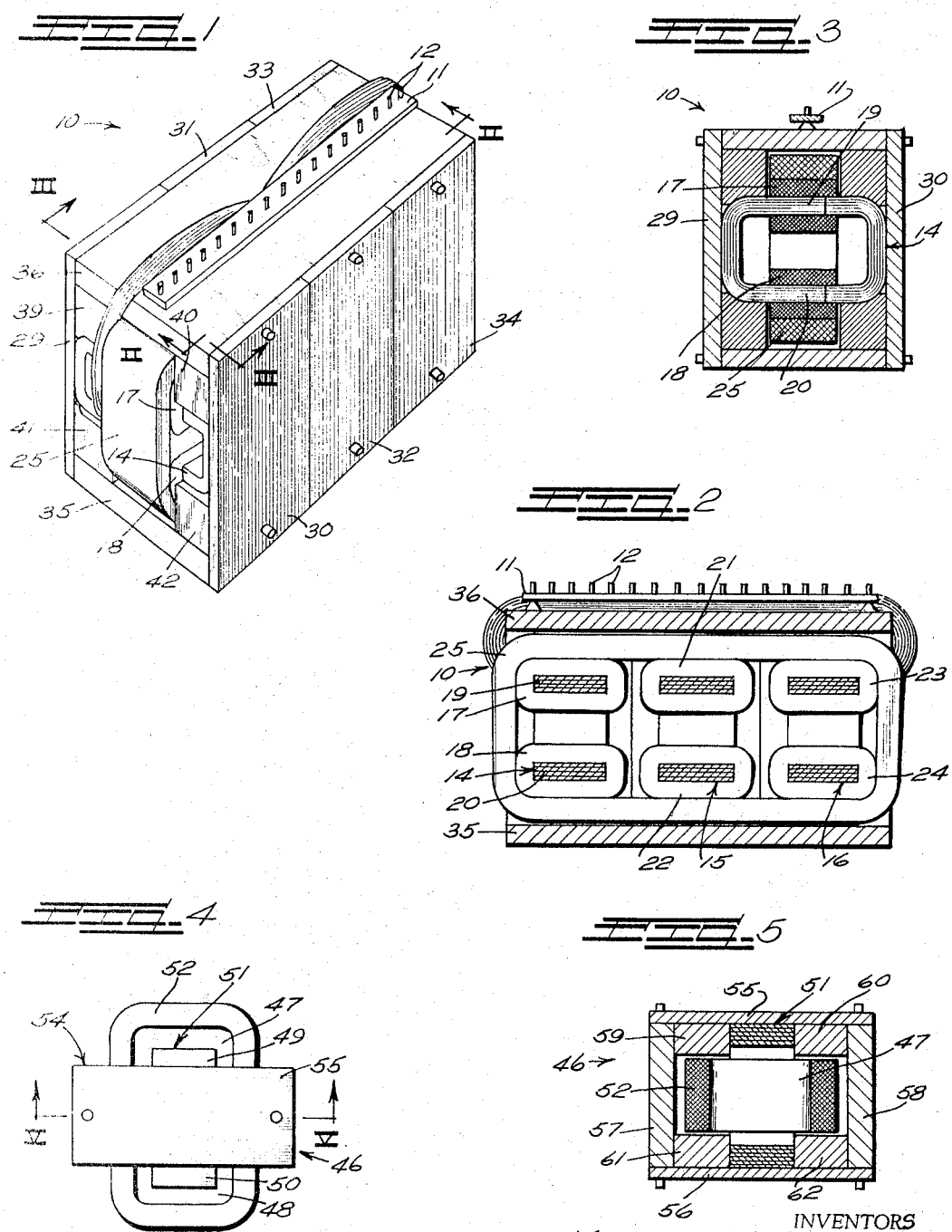

3,308,413
SATURABLE REACTOR HAVING D.C. FLUX PATHS OF SOLID FERROMAGNETIC MATERIAL
Kenneth W. Schroeder, Arlington Heights, and Bruce G. Isaacson, Chicago, Ill., assignors to Magnaflux Corporation, Chicago, Ill., a corporation of Delaware
Filed Aug. 3, 1964, Ser. No. 386,924
6 Claims. (Cl. 336—155)

This invention relates to a saturable reactor and more particularly to a saturable reactor which is readily and inexpensively constructed while having excellent performance characteristics.

Saturable reactors are known wherein a core member is provided having four parallel legs with a pair of A.C. windings disposed on the inner legs which form portions of an A.C. flux loop and which also form parallel branches of D.C. flux loops through the outer legs. D.C. winding means are provided for establishing a unidirectional flux in the D.C. flux loops to control the degree of saturation of the material in the A.C. flux loops, and to thereby control the impedance of the A.C. windings. In such saturable reactors, the pair of A.C. windings are connected in series or in parallel and are balanced in a manner such as to minimize induction of A.C. in the D.C. winding means.

Such saturable reactors and others of similar construction are quite satisfactory in operation and are widely used. They are however quite expensive, particularly when made in small quantities for special purposes, as is often the case, because the four-legged core members must be formed of laminations of magnetic material, to minimize eddy current losses, and the laminations must be stamped to precise shapes, necessitating expensive dies. In addition, the A.C. coils must be accurately balanced to avoid generation of high voltage A.C. in the D.C. winding means.

This invention was evolved with the general object of providing an improved saturable reactor which is inexpensive in construction while being efficient and reliable in operation.

According to this invention, a saturable reactor is provided wherein A.C. windings are disposed on core means of laminated magnetic material, with core means of solid ferromagnetic material being provided for cooperation with the laminated magnetic material to define D.C. flux paths linking the A.C. windings. The solid ferromagnetic material is much less expensive than the high grade material which must be used in the laminations for the A.C. flux paths. In addition and perhaps more important, the A.C. flux path can have a generally O-shaped configuration, and it is possible to obtain any desired size within a wide range of sizes, using standard commercially available laminations, while solid ferromagnetic material of the required size can be readily and inexpensively obtained. Accordingly, any desired performance characteristics can be obtained at minimum expense.

The use of the solid ferromagnetic material does not detract from the performance characteristics of the reactor and on the contrary it is found that improved characteristics can be obtained in that the solid ferromagnetic material can have eddy current loss characteristics acting as a deterrent to flow of A.C. flux, to confine the A.C. flux to the laminated magnetic material. As a result, the solid ferromagnetic material minimizes the generation of A.C. voltages in the D.C. winding means due to an unbalance of the effective A.C. currents flowing in the A.C. windings.

According to a specific feature of the invention, both the laminated and solid cores are of generally O-shaped configuration with the laminated core disposed centrally within the solid core to provide a symmetrical construction. In one type of construction, the two O-shaped cores are disposed generally on the same axis, while in another type of construction, the O-shaped cores are disposed on generally transverse axes.

Another specific feature of the invention is in the provision of a saturable reactor for multi-phase operation, wherein two or more laminated cores for forming A.C. flux paths are disposed within a solid core in a unified assembly.

This invention contemplates other objects, features and advantages which will become more fully apparent from the following detailed description taken in conjunction with the accompanying drawings which illustrate preferred embodiments and in which:

FIGURE 1 is a perspective view showing a three-phase saturable reactor constructed according to the principles of this invention;

FIGURE 2 is a sectional view taken substantially along line II—II of FIGURE 1;

FIGURE 3 is a sectional view taken substantially along line III—III of FIGURE 1;

FIGURE 4 is a top plan view of a modified form of saturable reactor constructed according to the invention; and FIGURE 5 is a sectional view taken substantially along line V—V of FIGURE 4.

Reference numeral 10 generally designates a three-phase saturable reactor which includes a terminal block 11 with terminals 12 thereon, certain of which are connected to A.C. windings to be connected between a three-phase A.C. source and a three-phase load, and others of which are connected to a D.C. winding to be connected to a D.C. control voltage source to control the degree of magnetic saturation of cores within the reactor, and to thereby control the effective impedance presented by the A.C. windings.

The reactor comprises three generally O-shaped cores 14, 15 and 16 of laminated ferromagnetic material. The illustrated cores are of a type referred to as "Hypersil" cores which are formed by winding sheet magnetic material around a suitable arbor, the wound material being thereafter heat-treated to eliminate stresses and being then cut to form C-shaped sections to be placed over windings. Other standard commercially available types of laminated cores may be used, such as those formed by stacking L-shaped or C-shaped and I-shaped laminations.

A pair of A.C. windings 17 and 18 are disposed on spaced parallel opposed portions 19 and 20 of the core 14 and pairs of A.C. windings 21 and 22 and 23 and 24 are similarly disposed on portions of the cores 15 and 16.

In accordance with this invention, the degree of saturation of the cores 14–16 is controlled by a single D.C. winding 25 which surrounds the A.C. windings 17 and 18, 21 and 22 and 23 and 24, and solid ferromagnetic material provides return paths for the D.C. flux. In particular, the outer surfaces of the cores 14, 15 and 16 are firmly engaged with inwardly facing surface portions of three pairs of solid steel side plates 29 and 30, 31 and 32 and 33 and 34 which are secured at their lower and upper edges to side edges of solid steel bottom and top plates 35 and 36. Thus a rectangular housing is provided and a generally O-shaped core of solid ferromagnetic material is provided for each of the laminated cores 14–16 to define D.C. flux paths having parallel branches through the opposed leg portions 19 and 20 of the core 14 and through corresponding portions of the cores 15 and 16. With this arrangement, the degree of saturation of the cores 14–16 may be controlled by controlling the current through the D.C. winding 25. The plates are preferably of solid steel of a standard readily available type, and the dimensions and compositions are not critical. Thus standard readily available components are used and the reactor can be readily designed to meet required performance characteristics, with minimum expense.

The disposition of the pairs of A.C. windings on parallel branches of the D.C. flux paths is for the purpose of avoiding induction of A.C. currents in the D.C. control winding circuit. This condition is somewhat difficult to attain due to unavoidable unbalances in the A.C. currents and departures from symmetry in the magnetic parts. It is found however that the use of solid ferromagnetic material in the D.C. flux paths substantially reduces the induction of such A.C. currents, due to the high eddy current loss characteristics of the solid ferromagnetic material. Accordingly, the use of the solid ferromagnetic material not only reduces the cost of the reactor, but also improves its performance characteristics.

To decrease the reluctance of the D.C. paths and further improve performance without increasing the overall size of the unit, solid steel bars 39, 40, 41 and 42 are preferably provided on the insides of the corners of the rectangular structure defined by the plates 29–36, in engagement with the top and bottom and side plates and with side surface portions of the O-shaped cores 14–16. When used with O-shaped cores having rounded corners, the surfaces of the bars are preferably contoured to obtain maximum surface engagement therewith, as shown.

Referring to FIGURES 4 and 5, reference numeral 46 generally designates a modified form of reactor, wherein a pair of A.C. windings 47 and 48 are disposed on leg portions 49 and 50 of an O-shaped core 51 of laminated ferromagnetic material and a D.C. control winding 52 surrounds both the A.C. windings 47 and 48. To provide a return path for D.C. flux, a generally O-shaped core 54 of solid steel is provided, comprising top and bottom plates 55 and 56 and side plates 57 and 58, to define a generally rectangular structure. To decrease the reluctance of the D.C. flux paths, solid steel bars 59 and 60 and 61 and 62 may preferably be disposed on the insides of the corners of the rectangular structure so defined, in firm engagement with inner surfaces of the plates 55–58, and with surfaces of the laminated core 51.

This construction is thus quite similar to that of FIGURES 1–3 but differs therefrom in that the axis of the O-shaped A.C. core 51 is at right angles to the axis of the D.C. core 54. Two or more units similar to the reactor 46 may be combined in a single unified structure, for multi-phase operation.

It will be understood that modifications and variations may be effected without departing from the spirit and scope of the novel concepts of this invention.

We claim as our invention:

1. In a saturable reactor, a pair of A.C. winding means, D.C. winding means, first core means of laminated ferromagnetic material defining a closed magnetic flux path and having a pair of spaced parallel opposed portions with said pair of A.C. winding means being on said pair of spaced parallel opposed portions for generating A.C. flux lines in said first core means, and second core means of solid ferromagnetic material including a pair of spaced portions on opposite sides of said first core means with a pair of surface areas on said spaced portions of said second core means being in firm engagement with a pair of surface areas of said first core means between which said pair of spaced parallel portions extend, said second core means cooperating with said first core means to define continuous D.C. flux paths having said D.C. winding means thereon for generating D.C. flux lines therein and for inductively linking said A.C. and D.C. winding means whereby said A.C. flux lines and said D.C. flux lines are generally parallel in said spaced parallel opposed portions of said first core means and whereby the degree of saturation of said laminated ferromagnetic material and the impedances of said pair of A.C. winding means are controlled by the current through said D.C. winding means, said first core means having a generally O-shaped configuration, and said second core means having a generally rectangular configuration.

2. In a saturable reactor as defined in claim 1, said second core means comprising four plates connected together to define a rectangular structure, and bars of solid ferromagnetic material on the inside of the corners of said rectangular structure and in engagement with said first core means for reducing the reluctance of said D.C. flux paths.

3. In a saturable reactor as defined in claim 1, said first and second core means being disposed generally on the same axis.

4. In a saturable reactor as defined in claim 1, said first and second core means being disposed on generally transverse axes.

5. In a saturable reactor, a pair of A.C. winding means, D.C. winding means, first core means of laminated ferromagnetic material defining a closed magnetic flux path and having a pair of spaced parallel opposed portions with said pair of A.C. winding means being on said pair of spaced parallel opposed portions for generating A.C. flux lines in said first core means, and second core means of solid ferromagnetic material including a pair of spaced portions on opposite sides of said first core means with a pair of surface areas on said spaced portions of said second core means being in firm engagement with a pair of surface areas of said first core means between which said pair of spaced parallel portions extend, said second core means cooperating with said first core means to define continuous D.C. flux paths having said D.C. winding means thereon for generating D.C. flux lines therein and for inductively linking said A.C. and D.C. winding means whereby said A.C. flux lines and said D.C. flux lines are generally parallel in said spaced parallel opposed portions of said first core means and whereby the degree of saturation of said laminated ferromagnetic material and the impedances of said pair of A.C. winding means are controlled by the current through said D.C. winding means, said D.C. winding means being in generally surrounding relation to said first core means and said pair of A.C. windings.

6. In a saturable reactor for multi-phase operation, a plurality of pairs of A.C. winding means, D.C. winding means, a plurality of first core means of laminated ferromagnetic material each defining a closed magnetic flux path and each having a pair of spaced parallel opposed portions with said pairs of A.C. winding means being disposed on said pairs of spaced parallel opposed portions for generating A.C. flux lines in said plurality of first core means, and second core means of solid ferromagnetic material including a pair of spaced portions on opposite sides of said plurality of first core means with pairs of surface areas on said spaced portions of said second core means being in firm engagement with pairs of surface areas of said plurality of first core means between which said pairs of spaced parallel portions extend, said second core means cooperating with said plurality of first core means to define continuous D.C. flux paths having said D.C. winding means thereon for generating D.C. flux lines therein and for inductively linking said A.C. and D.C. winding means whereby said A.C. flux lines and said D.C. flux lines are in generally parallel relation in said spaced parallel opposed portions of each of said first core means and whereby the degree of saturation of said laminated ferromagnetic material and the impedances of said pairs of A.C. winding means are controlled by the current through said D.C. winding means, said second core means being disposed in generally surrounding relation to said plurality of first core means.

References Cited by the Examiner

UNITED STATES PATENTS

| | | | |
|---|---|---|---|
| 743,444 | 11/1903 | Burgess et al. | 336—83 X |
| 1,815,380 | 7/1931 | Porter et al. | 336—83 |
| 2,302,893 | 11/1942 | Roberts | 336—155 |
| 2,570,633 | 10/1951 | Barton | 336—208 X |
| 2,633,561 | 3/1953 | Hewlett | 336—170 X |
| 2,703,391 | 3/1955 | Gunderson | 336—212 X |

LEWIS H. MYERS, *Primary Examiner.*

R. K. SCHAEFER, *Examiner.*

D. J. BADER, T. J. KOZMA, *Assistant Examiners.*